United States Patent
Jones et al.

(10) Patent No.: US 10,266,350 B2
(45) Date of Patent: Apr. 23, 2019

(54) METHOD AND APPARATUS FOR UNLOADING A CARGO CONTAINER

(71) Applicant: Walmart Apollo, LLC, Bentonville, AR (US)

(72) Inventors: Nicholaus A. Jones, Fayetteville, AR (US); Matthew A. Jones, Bentonville, AR (US); Robert J. Taylor, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 109 days.

(21) Appl. No.: 15/398,273

(22) Filed: Jan. 4, 2017

(65) Prior Publication Data

US 2017/0190521 A1    Jul. 6, 2017

Related U.S. Application Data

(60) Provisional application No. 62/275,130, filed on Jan. 5, 2016.

(51) Int. Cl.
| | |
|---|---|
| *G06F 7/00* | (2006.01) |
| *B65G 65/00* | (2006.01) |
| *B65G 67/24* | (2006.01) |
| *B65G 43/08* | (2006.01) |

(52) U.S. Cl.
CPC ......... *B65G 65/005* (2013.01); *B65G 67/24* (2013.01); *B65G 43/08* (2013.01); *B65G 2203/042* (2013.01)

(58) Field of Classification Search
None
See application file for complete search history.

(56) References Cited

U.S. PATENT DOCUMENTS

| | | | |
|---|---|---|---|
| 5,597,282 | A | 1/1997 | Hoffman |
| 5,712,789 | A | 1/1998 | Radican |
| 6,437,702 | B1 | 8/2002 | Ragland |
| 6,823,985 | B2 | 11/2004 | Gilmore |
| 7,564,352 | B2 | 7/2009 | Ekstrom |
| 7,746,379 | B2 | 6/2010 | Jesson |
| 8,942,897 | B2 | 1/2015 | Foster |
| 2013/0173488 | A1* | 7/2013 | Deck ............... G06Q 10/08 705/333 |
| 2014/0199142 | A1 | 7/2014 | Criswell |
| 2014/0205403 | A1 | 7/2014 | Criswell |

(Continued)

FOREIGN PATENT DOCUMENTS

EP        2716591 B1    5/2015

OTHER PUBLICATIONS

PTC; App. No. PCT/US2016/067939; International Search Report and Written Opinion dated Feb. 27, 2017.

*Primary Examiner* — Yolanda R Cumbess
(74) *Attorney, Agent, or Firm* — Fitch, Even, Tabin & Flannery LLP

(57) ABSTRACT

The unpacked depth of a cargo container is automatically measured as the items are removed therefrom. Information regarding where the unpacked items are to be placed is automatically presented using an active display and determined as a function, at least in part, of the measured unpacked depth. By one approach the foregoing includes using received information that correlates particular items with corresponding packed locations within the cargo container.

18 Claims, 3 Drawing Sheets

(56) References Cited

U.S. PATENT DOCUMENTS

| | | |
|---|---|---|
| 2014/0341694 A1 | 11/2014 | Girtman |
| 2015/0094876 A1 | 4/2015 | Baldwin |
| 2015/0241209 A1 | 8/2015 | Jouper |
| 2015/0352721 A1* | 12/2015 | Wicks ................... B25J 9/1664 700/228 |
| 2016/0047646 A1* | 2/2016 | Ochsendorf ......... G01C 21/343 348/148 |

* cited by examiner

METHOD AND APPARATUS FOR UNLOADING A CARGO CONTAINER

CROSS-REFERENCE TO RELATED APPLICATION

This application claims the benefit of U.S. Provisional Application No. 62/275,130, filed Jan. 5, 2016, and is incorporated herein by reference in its entirety.

TECHNICAL FIELD

These teachings relate generally to unloading a cargo container.

BACKGROUND

Cargo containers of various kinds and sizes are known in the art. In many cases a given cargo container contains a plurality of separately-packed items (such as, for example, boxes that may themselves each contain a variety of commodities). A modern trailer for a semi-truck configuration serves as one common example in these regards, with such trailers often exceeding fifty feet in length.

The items that are off-loaded from such a cargo container are often initially placed in one of many available receiving and/or staging areas depending upon the contents of each such item. A truck trailer being unloaded at the loading dock for a retail shopping facility, for example, may have some of its contents placed in a first receiving area, other contents placed in a second receiving area, and so forth.

The items themselves will typically not reveal the appropriate receiving area, however. Instead, the persons unloading the cargo container must somehow be otherwise apprised of that information. By one approach a supervisor serves to make that determination for items as they are unloaded. That supervisor then verbally informs the person holding each item where to place the item in question. Such an approach can be slow and also error prone while tending to require additional personnel to properly effect.

BRIEF DESCRIPTION OF THE DRAWINGS

The above needs are at least partially met through provision of the method and apparatus for unloading a cargo container described in the following detailed description, particularly when studied in conjunction with the drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, the unpacked depth of a cargo container is automatically measured as the items are removed therefrom. Information regarding where the unpacked items are to be placed is automatically presented using an active display and determined as a function, at least in part, of the measured unpacked depth. By one approach the foregoing includes using received information that correlates particular items with corresponding packed locations within the cargo container.

These teachings are highly flexible in practice and will accommodate a variety of application settings. By one approach, for example, the unloading area comprises a loading dock (such as a loading dock for a retail shopping facility). The cargo container, in turn, can comprise a truck trailer (such as a truck trailer having an internal packing depth of at least 50 feet).

These teachings will also accommodate a variety of active displays. By one approach the display can comprise a flat-screen display. By another approach the display comprises a projected display. For example, the aforementioned information regarding where a particular item is to be placed can be projected upon the item itself.

So configured, a wide variety of items, intended for placement in any of a wide variety of receiving/staging areas, can be reliably and quickly associated with those receiving/staging areas to facilitate proper placement of such items following the removal of such items from a cargo container. These teachings comprise a highly intuitive user interface that requires little or no up-front formal training.

Figure 1:
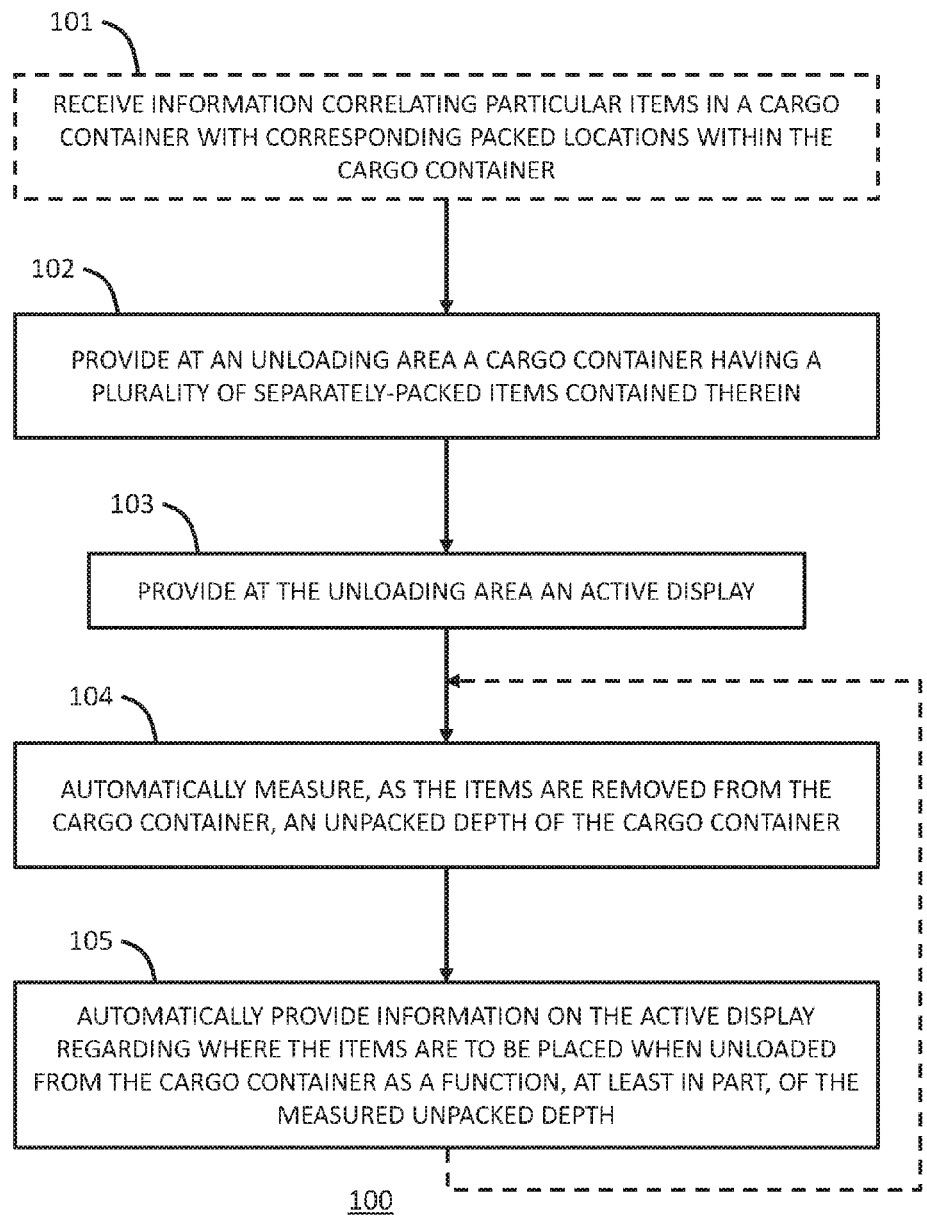
FIG. 1 comprises a flow diagram as configured in accordance with various embodiments of these teachings.

These and other benefits may become clearer upon making a thorough review and study of the following detailed description. Referring now to the drawings, and in particular to FIG. 1, an illustrative process 100 that is compatible with many of these teachings will now be presented in conjunction with an illustrative application setting presented in FIG. 2.

Figure 2:
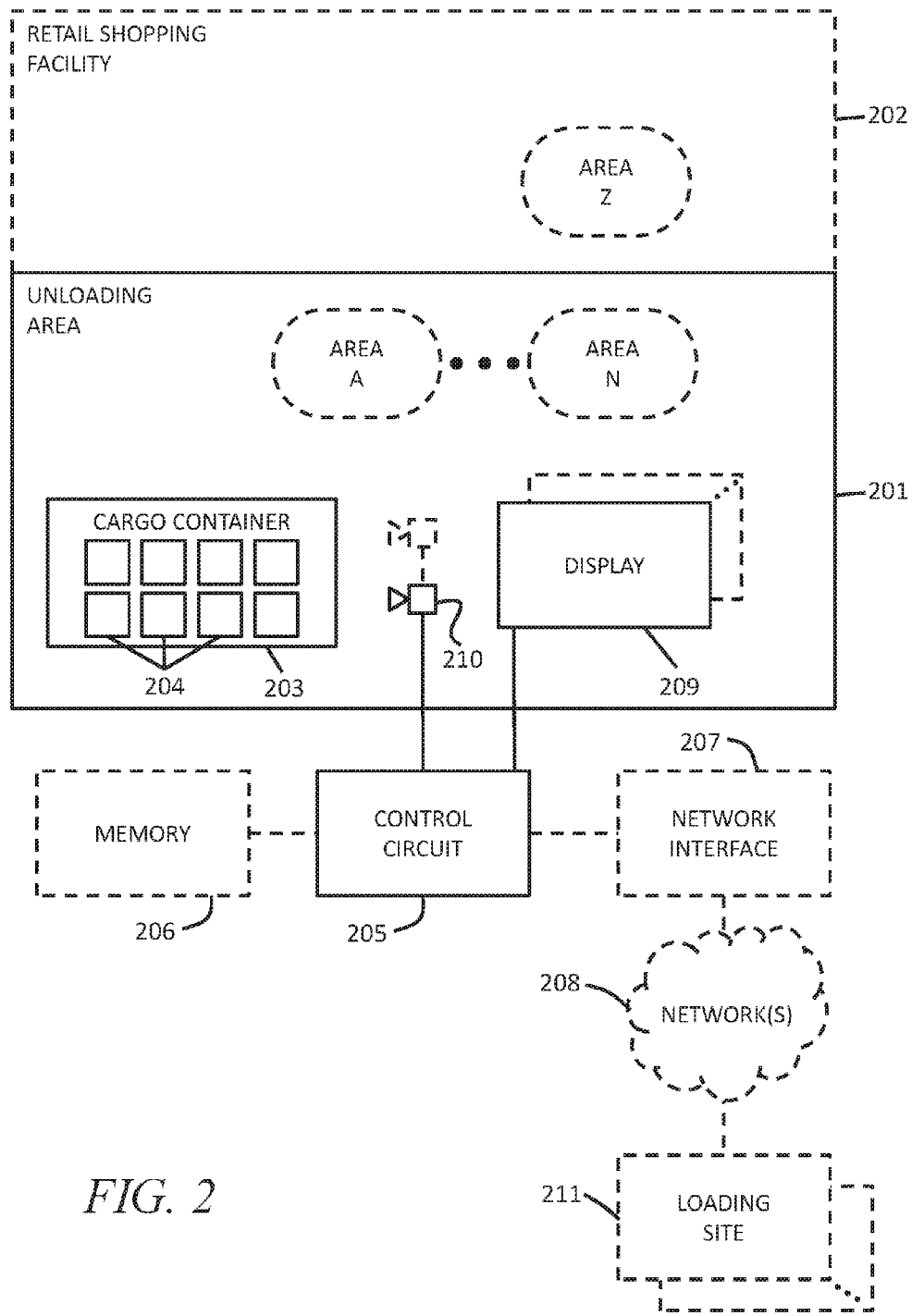
FIG. 2 comprises a block diagram as configured in accordance with various embodiments of these teachings.

FIG. 2 presents an unloading area 201. These teachings will accommodate a variety of cargo-unloading paradigms. In this particular example the unloading area 201 comprises a loading dock that itself comprises a part of a retail shopping facility 202. This retail shopping facility 202 comprises a bricks-and-mortar (i.e., physical) facility in which products are physically displayed and offered for sale to customers who physically visit the facility. The retail shopping facility 202 may include one or more of sales floor areas, checkout locations (i.e., point-of-sale (POS) stations), customer service areas other than checkout locations (such as service areas to handle returns), parking locations, entrance and exit areas, stock room areas, stock receiving areas, hallway areas, common areas shared by merchants, and so on. The facility may be any size of format facility, and may include products from one or more merchants. For example, the retail shopping facility 202 may be a single store operated by one merchant or may be a collection of stores covering multiple merchants such as a mall.

In this illustrative example a cargo container 203 is located at the unloading area 201. These teachings will accommodate a variety of cargo-containing paradigms. In this illustrative example the cargo container 203 comprises a truck trailer having an internal packing depth (i.e., length of the trailer) of approximately 53 feet, that depth being a typical depth for a common 18-wheel tractor/trailer rig. (These teachings will accommodate being provisioned with information regarding the total depth of the cargo container 203 via, for example, a corresponding bill of lading or information otherwise provided, for example, by a sourcing warehouse, distribution center, and so forth.) In this example the cargo container 203 has doors (or a gate or other movable barrier) that open to provide access to the interior of the cargo container 203. It is through that portal that associates will enter the cargo container 203 to access and remove a plurality of separately-packed items 204 that are contained therein.

These teachings will accommodate a variety of such items 204. These items will typically comprise a closed box or carton comprised of paperboard, plastic, and/or wood or other suitable material. Such a container may contain only a single product to be sold at retail or may contain a plurality of similar (or different) such products. In other cases the item may not be fully closed. In yet other cases the item may comprise a pallet or the like having one or more products secured to an upper surface thereof. These examples are intended to serve an illustrative purpose and are not intended to serve as an exhaustive listing.

Also in this illustrative example a control circuit 205 comprises a part of the enabling apparatus. Being a "circuit," the control circuit 205 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 205 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 205 is configured (for example, by using corresponding programming as will be well understood by those skilled in the art) to carry out one or more of the steps, actions, and/or functions described herein.

By one optional approach the control circuit 205 operably couples to a memory 206. This memory 206 may be integral to the control circuit 205 or can be physically discrete (in whole or in part) from the control circuit 205 as desired. This memory 206 can also be local with respect to the control circuit 205 (where, for example, both share a common circuit board, chassis, power supply, and/or housing) or can be partially or wholly remote with respect to the control circuit 205 (where, for example, the memory 206 is physically located in another facility, metropolitan area, or even country as compared to the control circuit 205).

In addition to the information described herein, this memory 206 can serve, for example, to non-transitorily store the computer instructions that, when executed by the control circuit 205, cause the control circuit 205 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

In this example the control circuit 205 also operably couples to a network interface 207. So configured the control circuit 205 can communicate with other elements via the network interface 207. Network interfaces, including both wireless and non-wireless platforms, are well understood in the art and require no particular elaboration here. So configured, the network interface 207 can compatibly communicate via one or more available networks 208 including, as desired, wireless and/or non-wireless networks. By one approach the network 208 can include the Internet.

The control circuit 205 also operably couples to one or more active displays 209. By one approach the active display 209 comprises a flat-screen display. Such a flat-screen display can be located relatively close to the cargo container 203 and in particular can be disposed and oriented such that associates leaving the cargo container 203 with one or more items 204 can readily view and comprehend information displayed on the flat-screen display. In some cases a conveyor may extend outwardly of the interior of the cargo container 203 to deliver the items 204 from within the cargo container 203 to some position that is remote from the interior of the cargo container 203. In that case the active display 209 can be placed at or near the end of that conveyor to make the active display 209 available to the associates who are sorting the items 204 being delivered by that conveyor.

By another approach, in lieu of the foregoing or in combination therewith, the active display can comprise a projected display. As described below in more detail, the corresponding projector can be disposed and oriented to project the aforementioned information on the item 204 itself, either before the associate exits the cargo container 203 bearing the item 204 or shortly thereafter.

Numerous such displays are known in the art. Accordingly, as the present teachings are not overly sensitive to any particular selections in these regards, further elaboration regarding such displays is not provided here for the sake of brevity.

The control circuit 205 also operably couples to one or more distance-measuring sensors 210. Various distance-measuring sensors are known in the art including light-based sensors and sound-based sensors. Again, further details are not provided here in relation to such sensors as those skilled in the art are already readily informed. This distance-measuring sensor 210 is disposed and oriented to automatically measure an unpacked depth of the cargo container 203. Accordingly, the distance-measuring sensor 210 will automatically measure that unpacked depth as the items 204 are removed from the cargo container 203.

Figure 3:
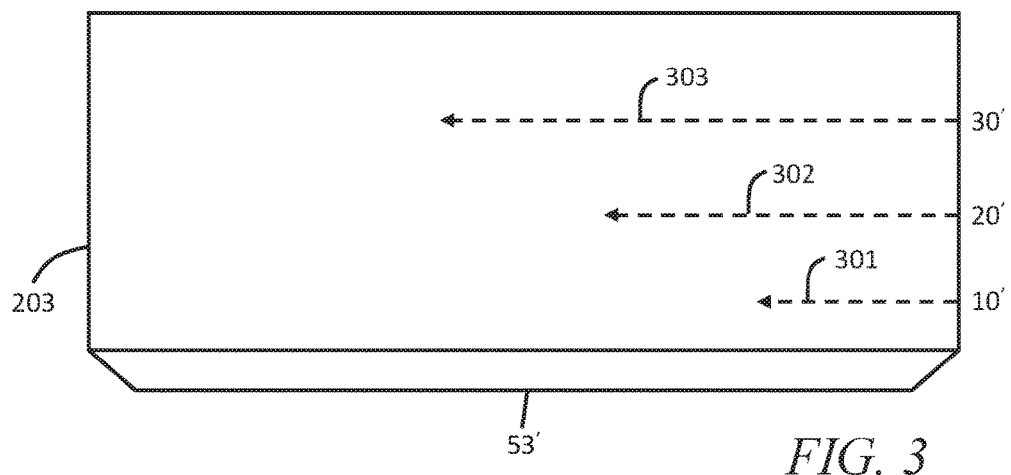
FIG. 3 comprises a side elevational schematic view as configured in accordance with various embodiments of these teachings.

With continued reference to FIGS. 1 and 2, at optional block 101 the aforementioned control circuit 205 receives information that correlates particular items 204 in the cargo container 203 with corresponding packed locations within the cargo container 203. Referring momentarily to FIG. 3, this information can correlate, for example, specific depths with particular items 204 that are known to have been placed at that depth. FIG. 3 illustrates a first depth 301 of 10 feet (where items 204 comprising a first product such as toothbrushes were packed), a second depth 302 of 20 feet (where items 204 comprising a second product such as towels were packed), and a third depth 303 of 30 feet (where items 204 comprising a third product such as cereal were packed).

It will be understood that no particular limitations are intended by this very simple example. These teachings will accommodate whatever resolution of depth may be suitable and appropriate. For example, the aforementioned information may correlate packed items 204 at every foot of depth, or every 6 inches of depth, or every 1 inch of depth, or whatever other distance interval may be suitable and appropriate for a given application setting. These teachings will also accommodate using a plurality of depth sensors to thereby sense the unpacked depth on, for example, either side of the cargo container 203. Using this approach, items can be generally identified using both their depth and their lateral-position information.

These teachings will also accommodate an automatically set/adjusted measurement interval. For example, the depth measurement can be correlated to a particular item only when and as the particular item is loaded into the cargo container 203. In that case, depth measurements that provide no further useful information regarding the packed location of a particular item 204 within the cargo container 203 are effectively discarded and not included in the information provided to the control circuit 205.

As an illustration of one approach in the foregoing regards, the aforementioned information that correlates particular items 204 with corresponding packed locations within the cargo container 203 can be initially developed at the loading site 211 (or sites) where the cargo container 203 is packed with the items 204. Those measurements could be developed manually or, more beneficially, by use of corresponding distance-measuring sensors that are configured to automatically measure, as the items 204 are packed into the cargo container 203, a present unpacked depth of the cargo container 203.

At block 102 the cargo container 203 is provided at the unloading area 201 for unloading of the items 204 packed therein. At block 103, and as described above, at least one active display 209 is also provided at the unloading area 201. At block 104, and as items are removed from the cargo container 203, the unpacked depth of the cargo container 203 is automatically measured (using, for example, the aforementioned distance-measuring sensor 210).

Using the automatically measured unpacked depth and the aforementioned information that correlates particular items 204 in the cargo container 203 with corresponding packed locations, the control circuit 205 determines what item 204 is presently being offloaded from the cargo container 203. The control circuit 205 can then access other information that correlates particular items 204 (and in particular the products contained within such items 204) to identify particular areas where the items are to be placed when unloaded.

FIG. 2 illustrates that the unloading area 201 itself may include a plurality of discrete unloading areas (denoted Area A through Area N in this illustrative example where N is an integer greater than 1). FIG. 2 also illustrates that one or more such unloading areas may be external to the unloading area 201 (in this case, within the retail shopping facility 202 itself, where Area Z is shown to be at least partially outside the unloading area 201).

Using the aforementioned information the control circuit 205 then, at block 105, automatically provides information on the active display 209 regarding where the items 204 are to be placed when unloaded from the cargo container 203 as a function, at least in part and as described above, of a currently measured unpacked depth. When the active display 209 comprises, for example, a flat-screen display, that flat-screen display could present the words "Area B" to indicate that items 204 presently being offloaded from the cargo container 203 are to be placed in receiving/staging area B.

Figure 4:
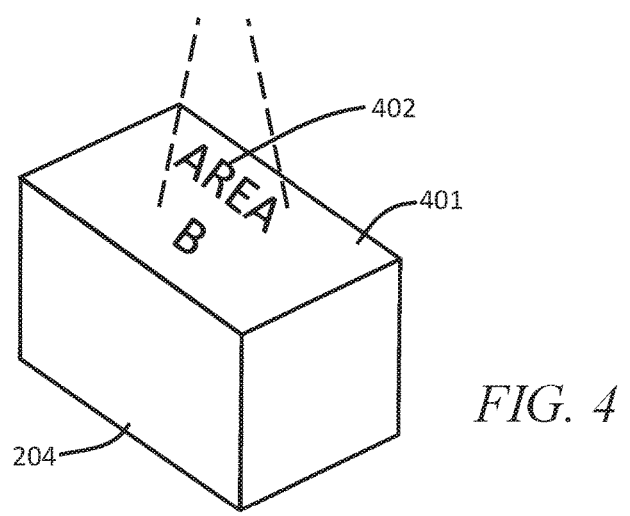
FIG. 4 comprises a perspective view as configured in accordance with various embodiments of these teachings.

When the active display 209 comprises a projected display, and referring now to FIG. 4, the information can be projected, for example, directly on the item 204 that is presently exiting the cargo container 203. For example, using a top surface 401 of the item 204 as a projection surface, the information 402 can be projected thereon by a corresponding image projector. So configured, the associate need only look down at the item 204 briefly to be quickly apprised of the area where this item 204 should be taken.

These teachings are highly flexible in practice and will accommodate various modifications and embellishments. By one approach, for example, two different receiving areas may be simultaneously displayed when uncertainty exists regarding where a particular item 204 should be placed. Such uncertainty could develop, for example, when some containers holding automotive parts and other containers holding beauty aids are both packed at the same depth within the cargo container 203. In this case it would also be possible to present additional information to help the associate determine which of the available areas should receive their particular item. For example, presuming the specific facts just presented, the display 209 could specify, "AUTOMOTIVE PARTS TO AREA B AND HEALTH AND BEAUTY AIDS TO AREA D."

As another example, the aforementioned information regarding the items themselves could be leveraged to also permit displaying other helpful information. When the item being unloaded is fragile, for example, the display 209 could add a corresponding caution. For example, the display 209 might read, "CAUTION—FRAGILE" followed by an indication of which area should receive the item.

So configured, no one associate need necessarily be tasked with only monitoring the unloading process and instructing other associates regarding where particular items 204 are to be taken. Instead, this process provides for automatically determining that information and then providing that information directly to an associate offloading a particular item 204. These teachings provide a highly intuitive user experience that requires little in the way of formal training, if any. These teachings can also contribute to reduced unloading time.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept. As but one simple example in these regards, in the examples described herein the unpacked depth of the cargo container is measured. It will be understood that these teachings will also readily accommodate measuring, instead, the packed depth of the cargo container. (Accordingly, for the sake of simplicity, it will be understood herein that references to measuring the unpacked depth of the cargo container include measuring the packed depth of the cargo container, as the latter approach constitutes an equivalent to the foregoing.)

What is claimed is:

1. A method comprising:
providing at an unloading area a cargo container having a plurality of separately-packed items contained therein and having a portal that provides access to the items packed in the cargo container;
providing at the unloading area an active display;
automatically measuring, as the items are removed from the cargo container, an unpacked depth of the cargo container from the portal;
automatically providing information on the active display regarding where the items are to be placed when unloaded from the cargo container as a function, at least in part, of the measured unpacked depth.

2. The method of claim 1 wherein the unloading area comprises a loading dock.

3. The method of claim 2 wherein the loading dock comprises a loading dock for a retail shopping facility.

4. The method of claim 1 wherein the cargo container comprises a truck trailer.

5. The method of claim 4 wherein the truck trailer has an internal packing depth of at least 50 feet.

6. The method of claim 1 wherein the active display comprises at least one of a flat-screen display and a projected display.

7. The method of claim 1 wherein automatically measuring the unpacked depth of the cargo container comprises using at least one of a light-based and a sound-based distance-measuring sensor.

8. The method of claim 1 wherein automatically providing the information on the active display regarding where the items are to be placed when unloaded comprises providing information regarding specific locations of a retail shopping facility.

9. The method of claim 1 further comprising:
receiving information correlating particular ones of the items with corresponding packed locations within the cargo container.

10. An apparatus comprising:
an unloading area;
a cargo container disposed at the unloading area, the cargo container having a plurality of separately-packed items contained therein and having a portal that provides access to the items packed in the cargo container;
an active display disposed at the unloading area;
a distance-measuring sensor configured to automatically measure, as the items are removed from the cargo container, an unpacked depth of the cargo container from the portal;
a control circuit operably coupled to the distance-measuring sensor and the active display and configured to present information on the active display regarding where the items are to be placed when unloaded from the cargo container as a function, at least in part, of the measured unpacked depth.

11. The apparatus of claim 10 wherein the unloading area comprises a loading dock.

12. The apparatus of claim 11 wherein the loading dock comprises a loading dock for a retail shopping facility.

13. The apparatus of claim 10 wherein the cargo container comprises a truck trailer.

14. The apparatus of claim 13 wherein the truck trailer has an internal packing depth of at least 50 feet.

15. The apparatus of claim 10 wherein the active display comprises at least one of a flat-screen display and a projected display.

16. The apparatus of claim 10 wherein the distance-measuring sensor comprises at least one of a light-based and a sound-based distance-measuring sensor.

17. The apparatus of claim 10 wherein the control circuit is configured to automatically provide the information on the active display regarding where the items are to be placed when unloaded by providing information regarding specific locations of a retail shopping facility.

18. The apparatus of claim 10 wherein the control circuit is further configured to:
receive information correlating particular ones of the items with corresponding packed locations within the cargo container.

* * * * *